(12) United States Patent
Nogami

(10) Patent No.: US 11,948,538 B2
(45) Date of Patent: Apr. 2, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kazuma Nogami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 357 days.

(21) Appl. No.: 17/141,274

(22) Filed: Jan. 5, 2021

(65) Prior Publication Data
US 2022/0028357 A1 Jan. 27, 2022

(30) Foreign Application Priority Data
Jul. 22, 2020 (JP) .................................. 2020-125726

(51) Int. Cl.
*G09G 5/38* (2006.01)
*G06F 3/14* (2006.01)

(52) U.S. Cl.
CPC .................. *G09G 5/38* (2013.01); *G06F 3/14* (2013.01); *G09G 2354/00* (2013.01)

(58) Field of Classification Search
CPC ......... G09G 5/38; G09G 2354/00; G06F 3/14
See application file for complete search history.

(56) References Cited

U.S. PATENT DOCUMENTS

| | | | | |
|---|---|---|---|---|
| 2015/0121177 A1* | 4/2015 | Iida | ....................... | G06F 3/0488 |
| | | | | 715/201 |
| 2019/0204998 A1* | 7/2019 | Hartrell | .................... | G10L 15/26 |
| 2020/0159767 A1* | 5/2020 | Durairaj | ................ | G06F 16/638 |

FOREIGN PATENT DOCUMENTS

| | | |
|---|---|---|
| JP | H10-274998 A | 10/1998 |
| JP | 2011-216112 A | 10/2011 |

OTHER PUBLICATIONS

Jan. 30, 2024 Office Action issued in Japanese Patent Application No. 2020-125726.

* cited by examiner

*Primary Examiner* — Samantha (Yuehan) Wang
(74) *Attorney, Agent, or Firm* — Oliff PLC

(57) ABSTRACT

An information processing apparatus generates a screen displayed on a display apparatus having a reading-out function of reading out display content sequentially, the information processing apparatus including a processor configured to generate an after-switching screen, the after-switching screen being a screen displayed by switching display on the display apparatus, the after-switching screen including specific information in a before-switching screen which is a screen before the switching, the after-switching screen being a screen in which the specific information is read out at an earlier time, the earlier time being earlier than a time at which the specific information is read out when the display content is read out sequentially in the displayed before-switching screen.

16 Claims, 10 Drawing Sheets

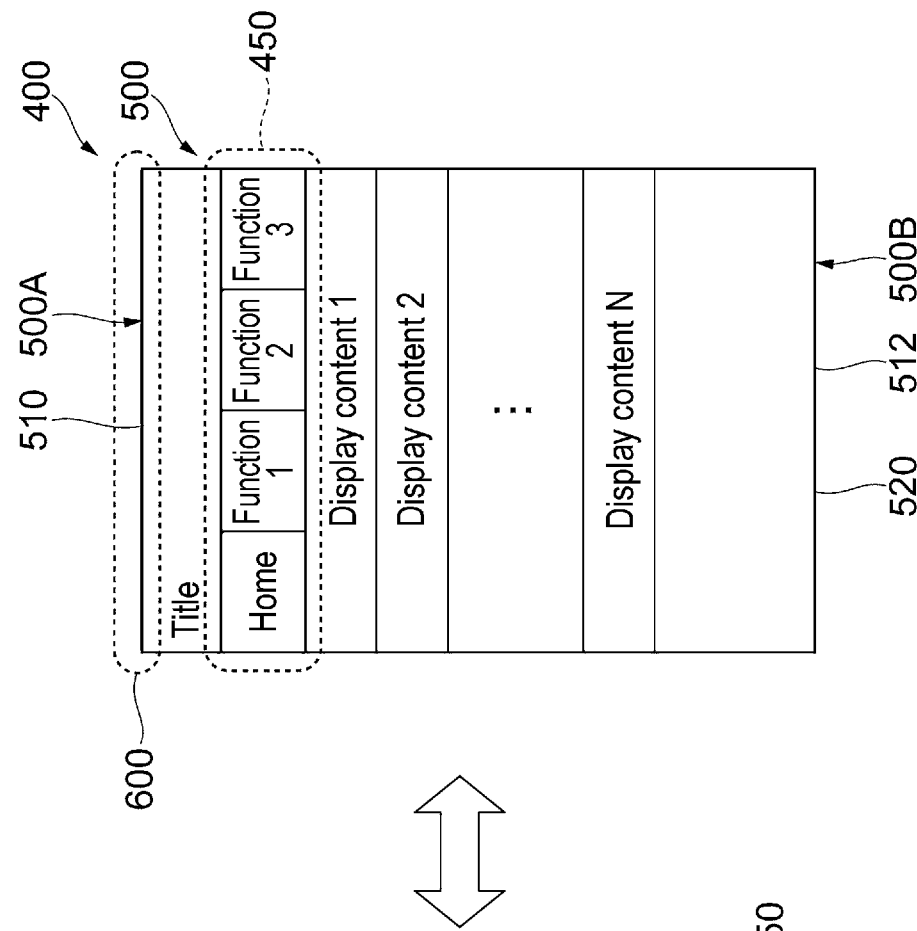
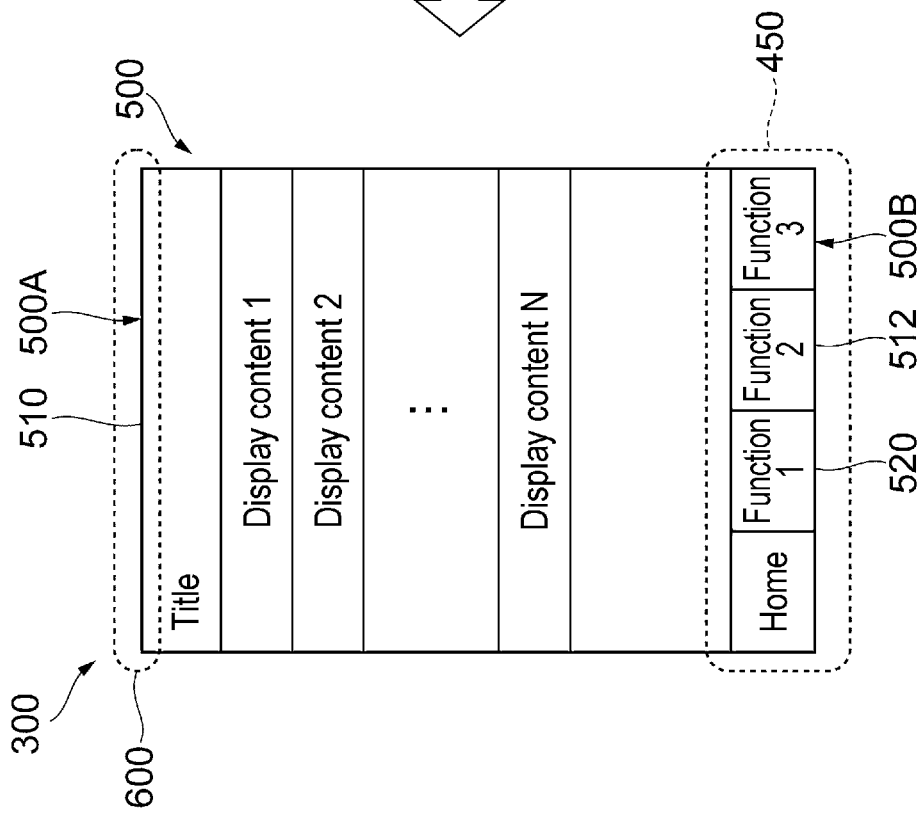

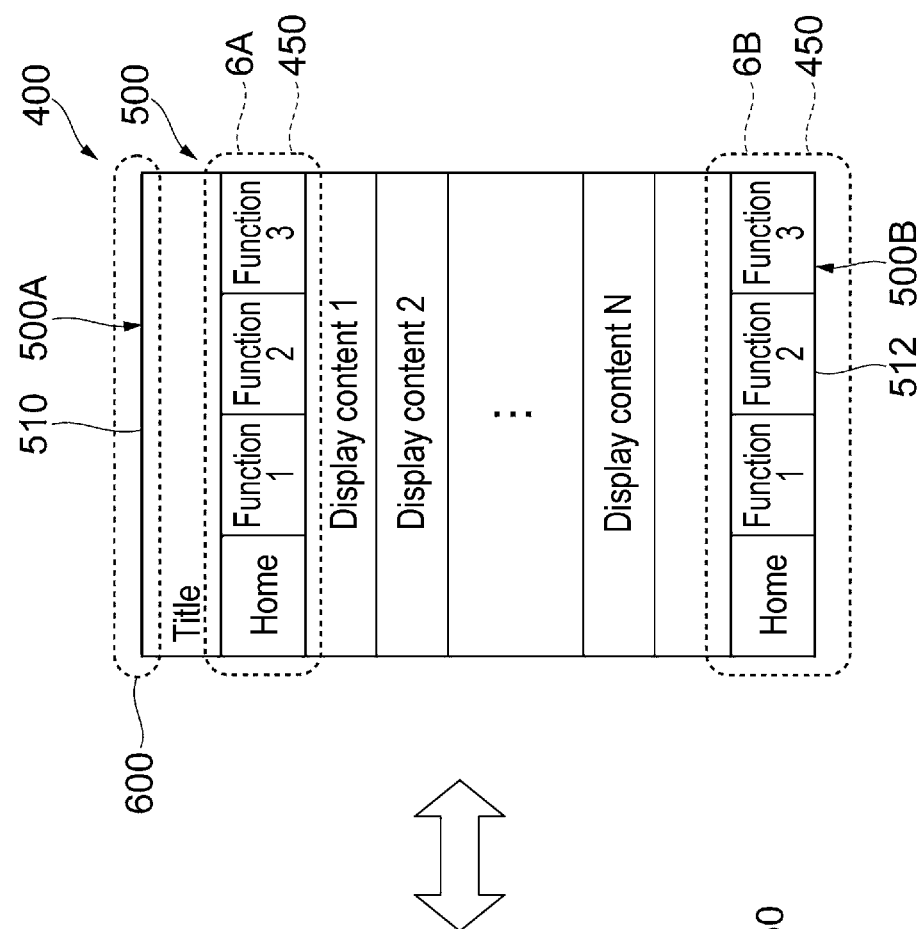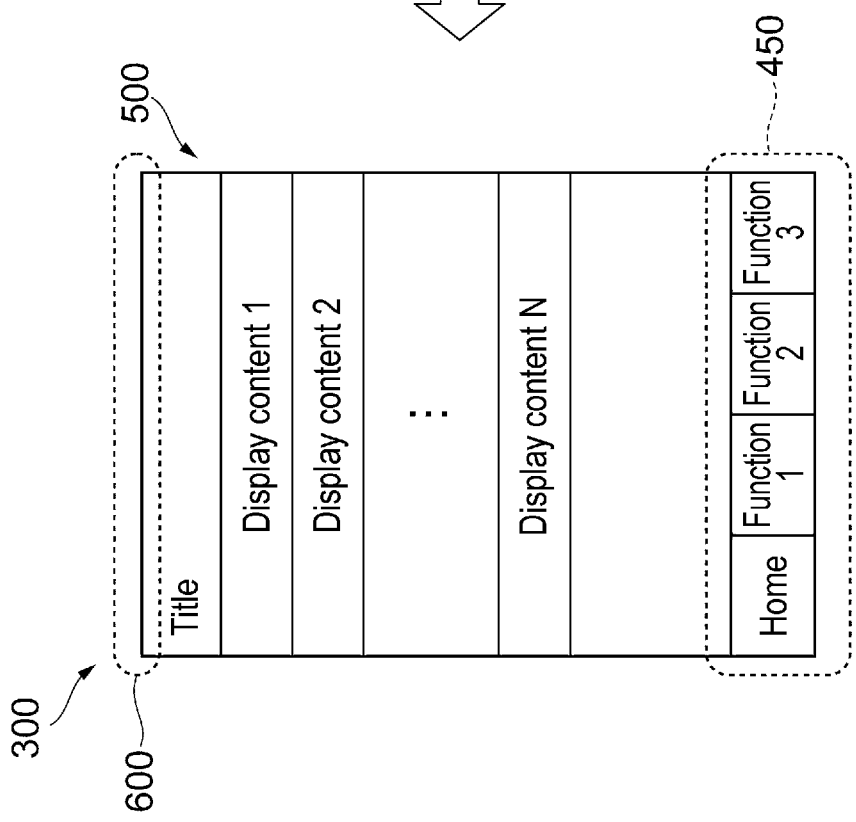
FIG. 6A
FIG. 6B

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-125726 filed Jul. 22, 2020.

BACKGROUND

(i) Technical Field

The present disclosure relates to an information processing apparatus and a non-transitory computer readable medium.

(ii) Related Art

Japanese Unexamined Patent Application Publication No. 10-274998 discloses a process of reading out sentences. In the process, a creator of a document adds reading order to the document, which is to be read out, so that the order is recognizable mechanically. A document reading-out apparatus reads out sentences in the document in the sequence according to the priority added to the document.

A display apparatus has a function of reading out display content sequentially. The display apparatus reads out display content sequentially, for example, from information displayed in an upper portion of the display screen. Thus, information in a lower portion of the display screen is read out at the end.

SUMMARY

Aspects of non-limiting embodiments of the present disclosure relate to a technique in which specific information is read out at an earlier time than a time when the display on a display apparatus is not switched or when information which is to be read out is displayed only at a single position of the display apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus generating a screen displayed on a display apparatus having a reading-out function of reading out display content sequentially. The information processing apparatus includes a processor configured to generate an after-switching screen. The after-switching screen is a screen displayed by switching display on the display apparatus. The after-switching screen includes specific information in a before-switching screen which is a screen before the switching. The after-switching screen is a screen in which the specific information is read out at an earlier time. The earlier time is earlier than a time at which the specific information is read out when the display content is read out sequentially in the displayed before-switching screen.

BRIEF DESCRIPTION OF THE DRAWINGS

Exemplary embodiments of the present disclosure will be described in detail based on the following figures, wherein:

FIGS. 3A and 3B are diagrams illustrating an example of a before-switching screen and an after-switching screen;

FIGS. 6A and 6B are diagrams illustrating another process example;

DETAILED DESCRIPTION

Exemplary embodiments of the present disclosure will be described below by referring to the attached drawings.

Figure 1:
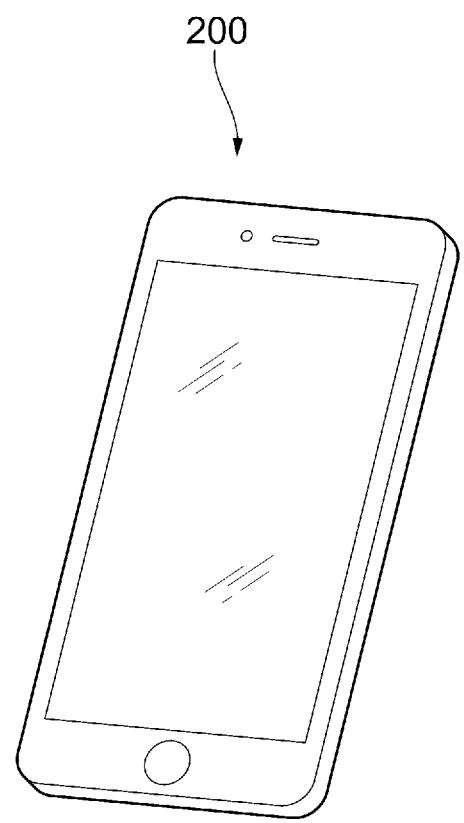
FIG. 1 is a diagram illustrating an information processing apparatus.

FIG. 1 is a diagram illustrating an information processing apparatus according to the present exemplary embodiments.

An information processing apparatus 200 according to the present exemplary embodiments is formed of an apparatus, such as a so-called smartphone or tablet terminal.

The information processing apparatus 200 is not limited to a smartphone or a tablet terminal, and may be, for example, a notebook computer or a game machine.

Figure 2:
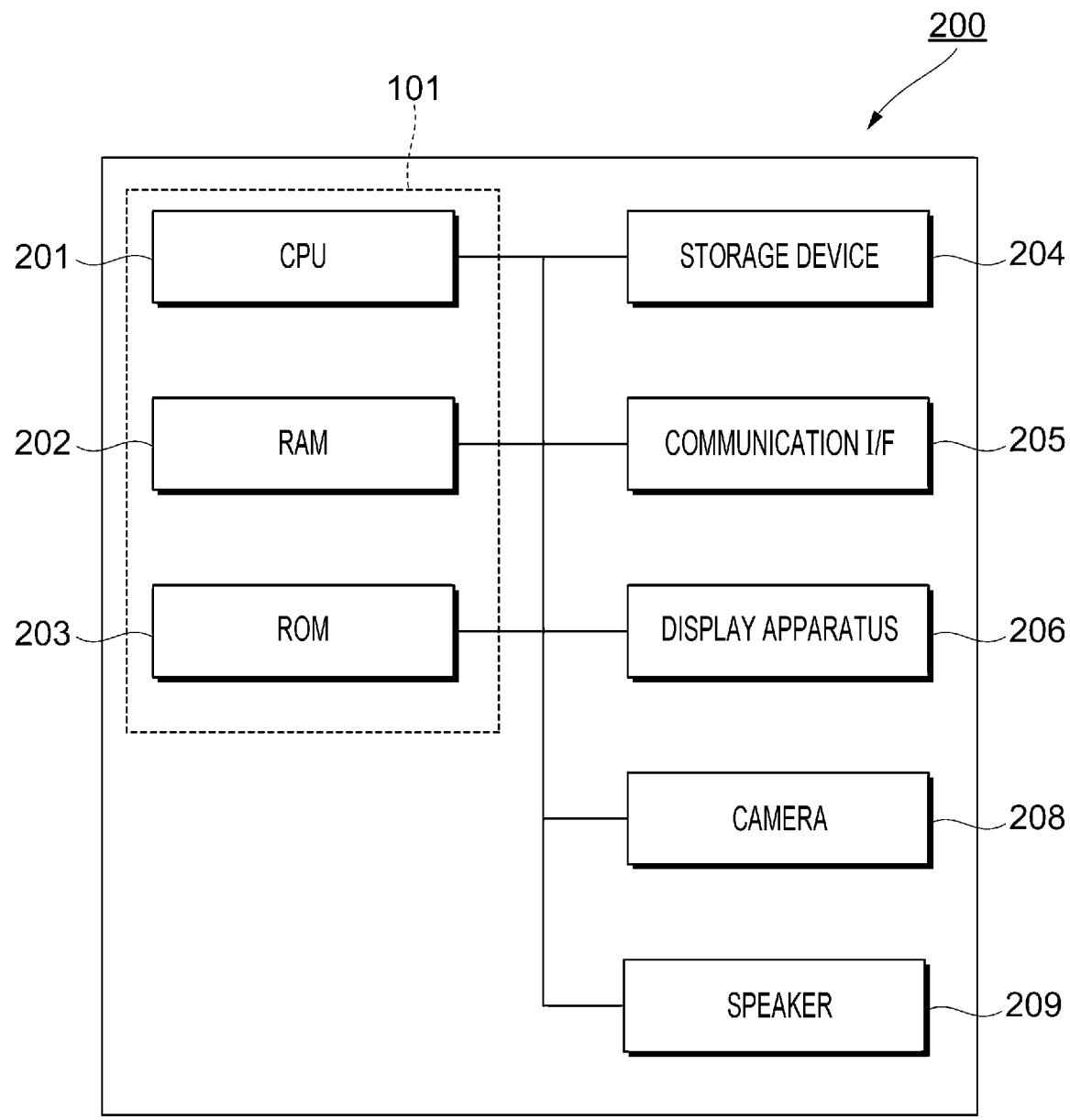
FIG. 2 is a diagram illustrating the hardware configuration of an information processing apparatus.

FIG. 2 is a diagram illustrating the hardware configuration of the information processing apparatus 200.

The information processing apparatus 200 includes a control unit 101 which controls the operations of the entire apparatus. The control unit 101 includes a central processing unit (CPU) 201 which is an exemplary processor, a random access memory (RAM) 202, and a read only memory (ROM) 203. The control unit 101 is a so-called computer.

The information processing apparatus 200 also includes a storage device 204 formed, for example, of a flash memory. The information processing apparatus 200 also includes a communication interface (communication I/F) 205 for performing communication with external apparatuses, and a display apparatus 206 which displays information, and a camera 208 which images a target. The information processing apparatus 200 also includes a speaker 209 which outputs sound.

The display apparatus 206 is formed, for example, of a touch-panel display. The type of the display is not particularly limiting, and may be, for example, a liquid-crystal display or an organic light-emitting diode (OLED) display.

The camera 208 is formed, for example, of an image sensor such as a charge coupled device (CCD).

Programs executed by the CPU 201 may be provided to the information processing apparatus 200 by storing the programs in a computer-readable recording medium, such as a magnetic recording medium (for example, a magnetic tape or a magnetic disk), an optical recording medium (for example, an optical disk), a magneto-optical recording medium, or a semiconductor memory.

The programs executed by the CPU 201 may be downloaded to the information processing apparatus 200 by using a communication unit such as the Internet.

In the embodiment, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiment, the term "processor" is broad enough to encompass one processor or plural processors in collaboration which are located physically apart from each other but may work cooperatively. The order of operations of the processor is not limited to one described in the embodiment, and may be changed.

The information processing apparatus 200 according to the present exemplary embodiment has a function of displaying information, and also has a reading-out function of reading out the display content sequentially. The information processing apparatus 200 may be regarded as a display apparatus having a function of reading out the display content sequentially.

The information processing apparatus 200 reads out the display content, which is displayed on the display apparatus 206, sequentially when a predetermined condition is satisfied, such as when a voice reading function is switched on.

More specifically, the display content displayed on the display apparatus 206 is read out, for example, sequentially from the top for output from the speaker 209.

First Exemplary Embodiment

In a first exemplary embodiment, the CPU 201, which serves as an exemplary processor, switches the display on the display apparatus 206. The CPU 201 generates an after-switching screen displayed after switching of the display.

More specifically, when the predetermined condition is satisfied, such as when a voice reading function is switched on, the CPU 201 switches the screen displayed on the display apparatus 206 and generates an after-switching screen for output on the display apparatus 206.

An example of the predetermined condition is the case in which an operator operates the information processing apparatus 200 to directly switch on a voice reading function.

Another example of the predetermined condition is the case in which an operator selects an application so that a voice reading function is switched on automatically.

Another example of the predetermined condition is the case in which an operator performs a specific operation (an operation other than the operation of directly switching on a voice reading function) on the information processing apparatus 200 so that a voice reading function is switched on automatically.

According to the first exemplary embodiment, in switching of a screen, the screen is switched from a before-switching screen, which is a screen before the switching, to an after-switching screen which is a screen after the switching.

According to the first exemplary embodiment, when specific information (hereinafter referred to as "specific information 450") is included in a before-switching screen, the CPU 201 generates an after-switching screen which also includes the specific information 450.

The CPU 201 generates such an after-switching screen that the specific information 450 is read out at an earlier time. More specifically, the CPU 201 generates such an after-switching screen that the specific information 450 is read out at an earlier time than a time at which the specific information 450 is read out in the displayed before-switching screen.

According to the first exemplary embodiment, the reading-out function reads out the display content, which is displayed on the display apparatus 206, sequentially.

According to the first exemplary embodiment, an after-switching screen is generated so that the time, at which the specific information 450 is read out in display of the after-switching screen, is earlier than the time at which the specific information 450 is read out in display of the before-switching screen.

According to the first exemplary embodiment, this causes the time, at which the specific information 450 is read out, to be made earlier than the case in which, in the before-switching screen which is still displayed without switching, reading out is performed.

FIGS. 3A and 3B are diagrams illustrating an example of a before-switching screen and an after-switching screen.

FIG. 3A illustrates a before-switching screen 300, and FIG. 3B illustrates an after-switching screen 400.

The information processing apparatus 200 according to the first exemplary embodiment has a reading-out function as described above. More specifically, according to the first exemplary embodiment, the reading-out function is implemented by an operation system (OS) stored, for example, in the ROM 203 (see FIG. 2) of the information processing apparatus 200.

The reading-out function reads out the display content, which is displayed on a display unit 500 included in the information processing apparatus 200, sequentially from the display content close to a first end 500A of the display unit 500 to the display content close to a second end 500B.

The display unit 500 of the information processing apparatus 200 is formed of a display screen of the display apparatus 206 (see FIG. 2).

According to the first exemplary embodiment, a predetermined reference 600 is provided. The reading-out function reads out the display content, which is displayed on the display unit 500, sequentially from the display content close to the reference 600 to the display content far from the reference 600.

More specifically, according to the first exemplary embodiment, a top end 510 (see FIG. 3A) of the display unit 500 is set as the reference 600. The reading-out function reads out the display content sequentially from the display content close to the top end 510 to the display content close to a bottom end 512.

In other words, the reading-out function reads out the display content from the top to the bottom of the display unit 500.

More specifically, when multiple lines of information arranged horizontally are displayed on the display unit 500, the reading-out function reads out each line of information sequentially from the topmost line of the lines toward lines located downward.

The reading-out function reads out each line of information, for example, sequentially from one end portion such as the left end portion to another end portion.

The CPU 201 generates the after-switching screen 400 which is illustrated in FIG. 3B and in which the specific information 450 is displayed closer to the reference 600 than the display position of the specific information 450 in the before-switching screen 300.

The CPU 201 determines whether each piece of information included in the before-switching screen 300 is the specific information 450, for example, on the basis of registration information obtained for the piece of the information. The registration information is registered in advance in association with each piece of information.

More specifically, according to the first exemplary embodiment, information corresponding to the specific information 450 is associated with the following information: information indicating an instruction that, when the information processing apparatus 200 enters a specific state, the position of the specific information 450 is to be changed to a position close to the reference 600; information indicating an instruction that the specific information 450 is not deleted and is still displayed even when the information processing apparatus 200 enters a specific state.

When any of information included in the before-switching screen 300 is associated with information indicating an instruction which is described above, for example, the CPU 201 generates the after-switching screen 400 in which the information included in the before-switching screen 300 is located closer to the reference 600.

When any of information included in the before-switching screen 300 is associated with the information indicating an instruction which is described above, for example, the CPU 201 generates the after-switching screen 400 in which the information included in the before-switching screen 300 is not deleted and is still displayed in the after-switching screen 400.

The after-switching screen 400, in which the information included in the before-switching screen 300 is not deleted and is still displayed in the after-switching screen 400, will be described in detail below.

In the before-switching screen 300 illustrated in FIG. 3A, information, "Home", "Function 1", "Function 2", and "Function 3", is displayed as exemplary specific information 450.

In this case, as illustrated in FIG. 3B, the CPU 201 generates, as the after-switching screen 400, a screen in which "Home", "Function 1", "Function 2", and "Function 3" are displayed closer to the top end 510 of the display unit 500 than their display position in the before-switching screen 300.

The "generation" encompasses not only the embodiment in which the before-switching screen 300 is edited and the after-switching screen 400 is generated, but also the embodiment in which the after-switching screen 400, which is generated in advance, is stored in the storage device 204, and is read from the storage device 204 for acquisition.

When reading out is performed on the after-switching screen 400 illustrated in FIG. 3B, "Home", "Function 1", "Function 2", and "Function 3" are read out at an earlier time than the time when reading out is performed on the before-switching screen 300.

In other words, "Home", "Function 1", "Function 2", and "Function 3" are read out in the after-switching screen 400 at an earlier time than the time, at which "Home", "Function 1", "Function 2", and "Function 3" are read out in the case where reading out is performed in the before-switching screen 300.

In other words, the CPU 201 generates, as the after-switching screen 400, a screen in which the position of the specific information 450 in the reading order is higher than the position in the reading order of the case where the before-switching screen 300 is displayed.

In the before-switching screen 300 illustrated in FIG. 3A, "Home", "Function 1", "Function 2", and "Function 3" are located at a lower position. As a result, the position of these in the reading order is low. In contrast, in the after-switching screen 400 illustrated in FIG. 3B, "Home", "Function 1", "Function 2", and "Function 3" are located at an upper position. As a result, the position of these in the reading order is high.

To make the position in the reading order higher, in addition to change of the position of each piece of display content on the display unit 500, part of the display content is removed as described below. Thus, the position of the specific information 450 in the reading order may be made higher.

According to the first exemplary embodiment, the specific information 450, such as "Home", "Function 1", "Function 2", and "Function 3", is exemplary display information used in switching of the display.

According to the first exemplary embodiment, when any of "Home", "Function 1", "Function 2", and "Function 3" is selected by an operator, the display on the display apparatus 206 is switched.

More specifically, when an operator touches, for selection, any of "Home", "Function 1", "Function 2", and "Function 3" on display unit 500, the display is switched and a different screen is displayed.

According to the first exemplary embodiment, "Home", "Function 1", "Function 2", and "Function 3" are taken as an example. These are exemplary. In addition to these, for example, "Home", "Product search", "Shop search", and "Order" may be used as the specific information 450.

In terms of operability of the operator, the specific information 450 may be disposed in a lower portion of a screen as illustrated in FIG. 3A. In this case, the operator may touch a display position of the specific information 450 with their single hand.

In contrast, when the specific information 450 is thus disposed in a lower portion of a screen, the specific information 450 is read out by the reading-out function at the end.

The specific information 450 is not only information for presentation of information, but also information used in reception of an operation from an operator. Thus, it is convenient for the specific information 450 to be read out at an earlier time.

According to the first exemplary embodiment, when the information processing apparatus 200 enters a specific state, the specific information 450 is displayed in an upper portion as described above. According to the first exemplary embodiment, before the information processing apparatus 200 enters a specific state, the specific information 450 is displayed in a lower portion.

Thus, according to the first exemplary embodiment, before the information processing apparatus 200 enters a specific state, the operability in selection of the specific information 450 with one hand is maintained.

According to the first exemplary embodiment, when the information processing apparatus 200 enters a specific state and the reading-out function is enabled, the specific information 450 is moved to an upper portion. In this case, a user is informed of the specific information 450 at an earlier time.

According to the first exemplary embodiment, the case in which the reference 600 is the top end 510 of the display unit 500, and in which, when the information processing apparatus 200 enters a specific state, the specific information 450 is moved to a position close to the top end 510 of the display unit 500 is described. However, the reference 600 is not limited to the top end 510 of the display unit 500.

The reference 600 may be other than the top end 510, and may be, for example, the right or left end of the display unit 500. For example, when the reference 600 is the right end of the display unit 500, the reading-out function performs reading sequentially from the right end to the left end of the display unit 500.

More specifically, in this case, the reading-out function performs reading on each line sequentially from the rightmost line to the leftmost line on the screen.

More specifically, in display of multiple lines of vertical-writing information, the reading-out function reads out each line of information sequentially from the rightmost line to the leftmost line of the multiple lines.

The reading-out function reads out each line of information, for example, sequentially from a first end portion such as a top end portion to a second end portion.

Figure 4A:
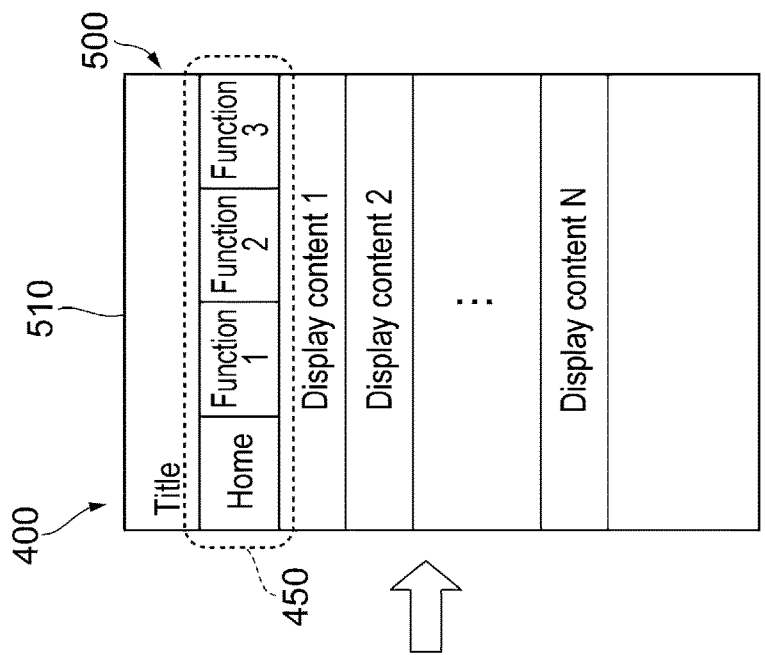
FIGS. 4A to 4C are diagrams illustrating another process example in an information processing apparatus.
Figure 4B:
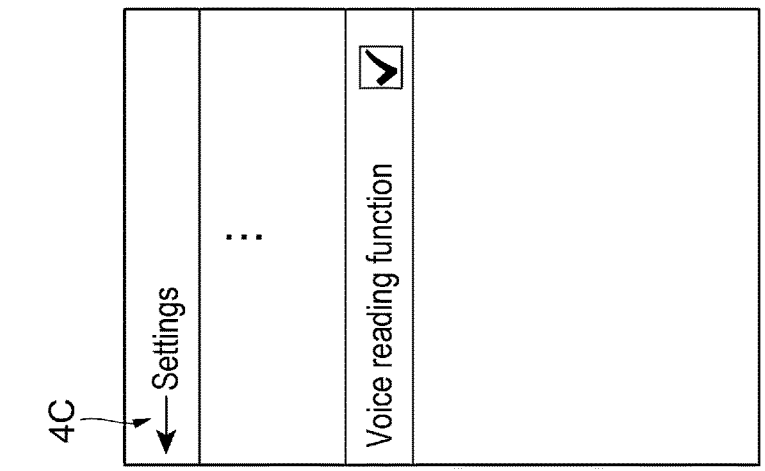
Figure 4C:
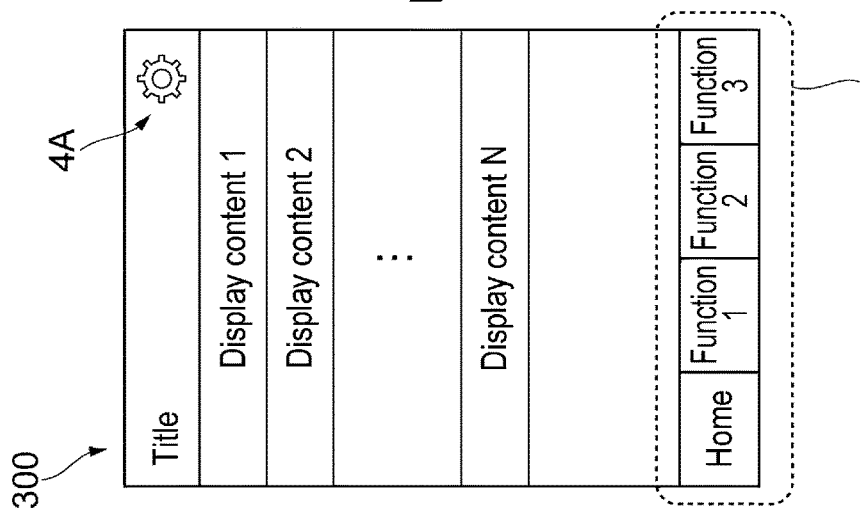

FIGS. 4A to 4C are diagrams illustrating another process example performed in the information processing apparatus 200.

In this process example, FIG. 4A illustrates the before-switching screen 300.

In this process example, an application is used to switch on/off the reading-out function. When the reading-out function is to be switched on, an operator operates a button indicated by using symbol 4A illustrated in FIG. 4A, and the screen is switched to that illustrated in FIG. 4B.

Then, the operator performs an operation on the screen illustrated in FIG. 4B, and the reading-out function is switched on. After that, the operator selects a button indicated by using symbol 4C, or restarts the application. Then, the after-switching screen 400 illustrated in FIG. 4C is displayed.

In the after-switching screen 400, like the case described above, "Home", "Function 1", "Function 2", and "Function 3", which are the specific information 450, are displayed closer to the top end 510 of the display unit 500 than the display position in the before-switching screen 300.

Thus, also in this case, the specific information 450, which is "Home", "Function 1", "Function 2", and "Function 3", is read out at an earlier time.

Figure 5B:
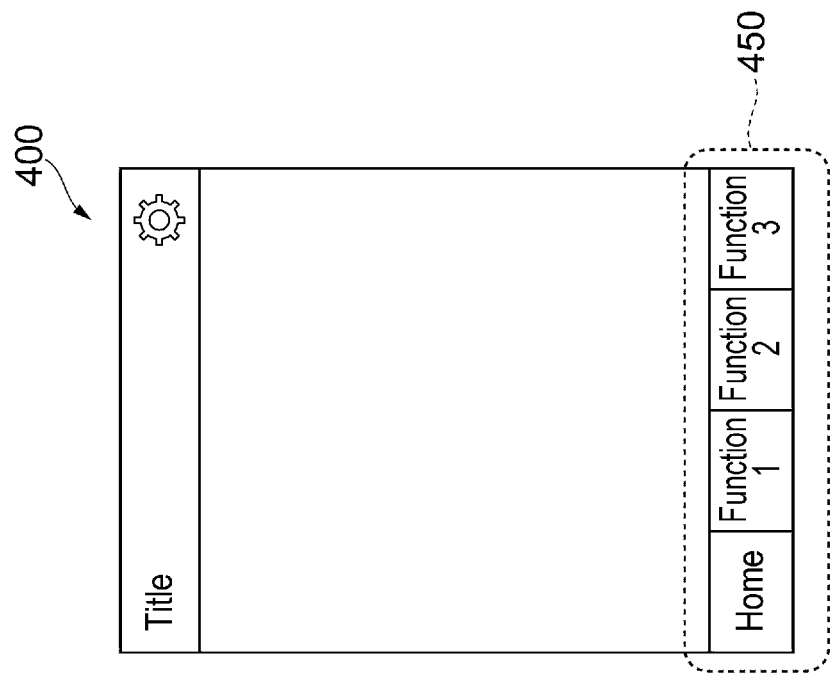
FIGS. 5A and 5B are diagrams illustrating another process example.
Figure 5A:
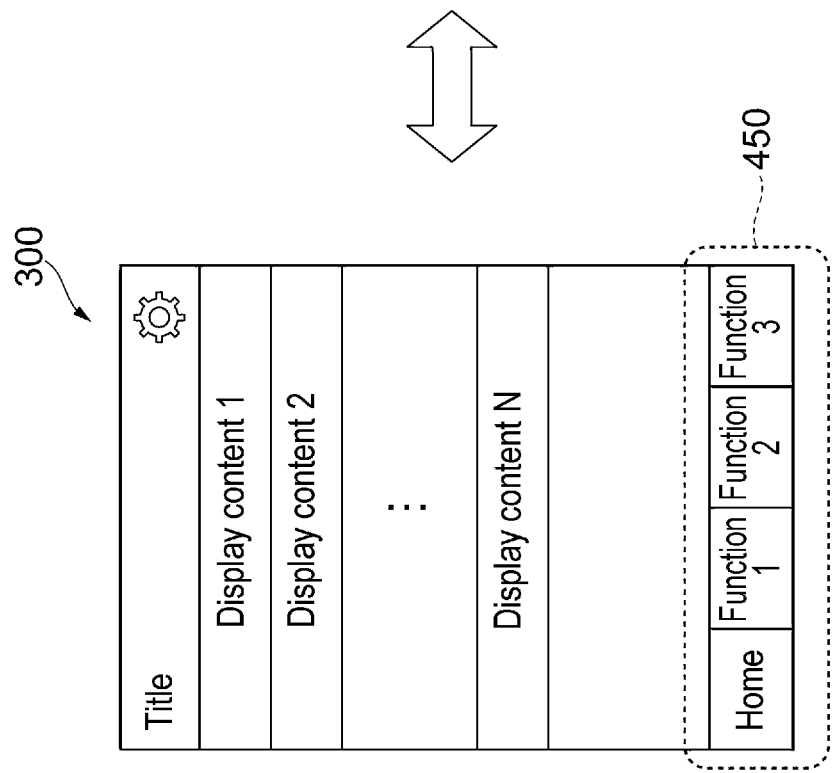

FIGS. 5A and 5B are diagrams illustrating another process example.

In the process example, the CPU 201 generates, as the after-switching screen 400, a screen having a smaller amount of information than that in the before-switching screen 300.

Specifically, as illustrated in FIG. 5A, information, "Display content 1" to "Display content N", is displayed in the before-switching screen 300. In the after-switching screen 400 illustrated in FIG. 5B, these pieces of information are deleted, resulting in a reduction in the amount of information.

Thus, also in this case, like the case described above, the specific information 450, which is "Home", "Function 1", "Function 2", and "Function 3", is read out in the after-switching screen 400 at an earlier time than that in the before-switching screen 300.

In other words, also in this case, like the case described above, the position, in the reading order, of the specific information 450, which is "Home", "Function 1", "Function 2", and "Function 3", is higher than the position in the reading order of the before-switching screen 300.

In other words, in this process example, part of information included in the before-switching screen 300 is deleted. However, the specific information 450 is not deleted and is still displayed in the after-switching screen 400.

In this case, the position of the specific information 450 in the reading order in display of the after-switching screen 400 is higher than the position in the reading order of the before-switching screen 300.

In the process example, when specific information 450 ("Home", "Function 1", "Function 2", and "Function 3") is read out in the displayed after-switching screen 400 illustrated in FIG. 5B, the screen is switched again.

Thus, the before-switching screen 300 illustrated in FIG. 5A is displayed. In other words, the before-switching screen 300 is displayed again.

FIGS. 6A and 6B are diagrams illustrating another process example.

In this example, additional specific information 450, which is "Home", "Function 1", "Function 2", and "Function 3", is displayed in the after-switching screen 400 illustrated in FIG. 6B.

In other words, the specific information 450, which is "Home", "Function 1", "Function 2", and "Function 3", is displayed not only in a lower portion of the display unit 500 but also in an upper portion of the display unit 500 in the after-switching screen 400. Thus, the specific information 450 is displayed at multiple positions.

In other words, the specific information 450 is displayed both on the top end 510 side and on the bottom end 512 side of the display unit 500 in the after-switching screen 400.

In this process example, the first specific information 450, which is "Home", "Function 1", "Function 2", and "Function 3" and which is indicated by using symbol 6A, is displayed at a position close to the top end 510 of the display unit 500.

Thus, also in this case, like the case described above, the specific information 450 is read out in the after-switching screen 400 at an earlier time than the time at which the specific information 450 is read out in the before-switching screen 300.

Further, in addition to the first specific information 450, the second specific information 450 is displayed in the after-switching screen 400 in a lower portion of the display unit 500 as indicated by symbol 6B.

According to the first exemplary embodiment, as described above, the reading-out function reads out the display content, which is displayed on the display unit 500, sequentially from the display content close to the top end 510 of the display unit 500 to the display content close to the bottom end 512.

In the display example in FIG. 6B, the specific information 450 is displayed both on the top end 510 side and on the bottom end 512 side. In other words, in the display example in FIG. 6B, the specific information 450 is displayed both on the first end 500A side and on the second end 500B side of the display unit 500.

In the after-switching screen 400 illustrated in FIG. 6B, additional specific information 450 may be displayed closer to the reference 600 than the display position of the specific information 450 in the before-switching screen 300.

More specifically, according to the first exemplary embodiment, in the before-switching screen 300 (see FIG. 6A), the specific information 450 is displayed in a lower portion of the display unit 500.

In contrast, in the after-switching screen 400 (see FIG. 6B), in addition to the specific information 450 displayed in a lower portion, additional specific information 450 is displayed closer to the reference 600.

The case in which, when the information processing apparatus 200 enters a specific state, such as when a voice reading function is switched on, the screen is switched to the after-switching screen 400 is described above as an example.

The display form in the information processing apparatus 200 is not limited to this.

Even when the information processing apparatus 200 enters a specific state, if the before-switching screen 300 satisfies a predetermined condition, the CPU 201 does not necessarily generate the after-switching screen 400.

Specifically, for example, the CPU 201 determines the display on the basis of the amount of information in the before-switching screen 300. For example, if the amount of information in the before-switching screen 300 is smaller than a predetermined threshold, the after-switching screen 400 is not necessarily generated.

Figure 7:
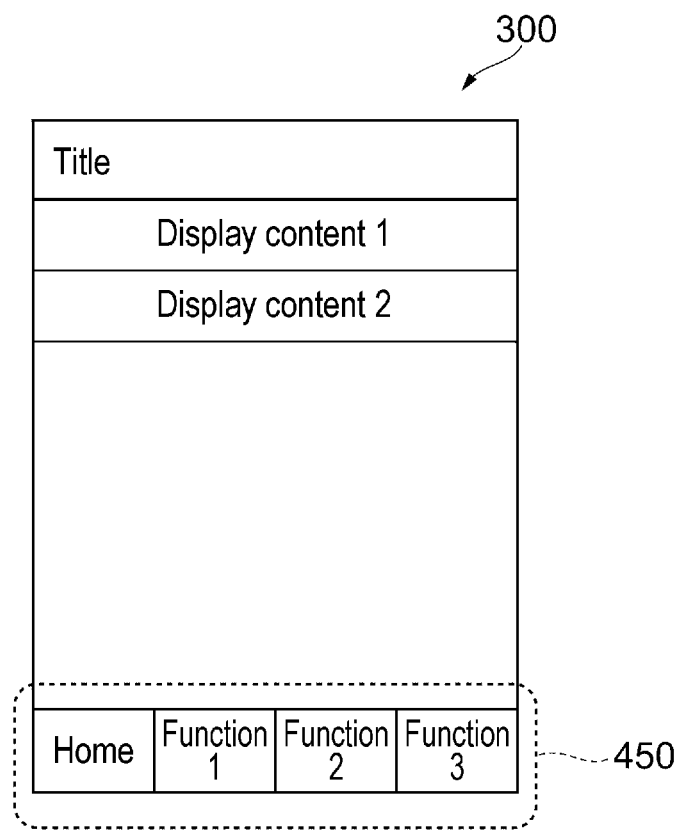
FIG. 7 is a diagram illustrating an exemplary before-switching screen.

More specifically, for example, FIG. 7, which illustrates another example of the before-switching screen 300, illustrates the case of a small amount of information in the before-switching screen 300. In this case, the CPU 201 does not generate the after-switching screen 400.

Even in the case where the before-switching screen 300 is still displayed without generation of the after-switching screen 400, a small amount of information in the before-switching screen 300 causes the specific information 450 to be read out early.

Figure 8:
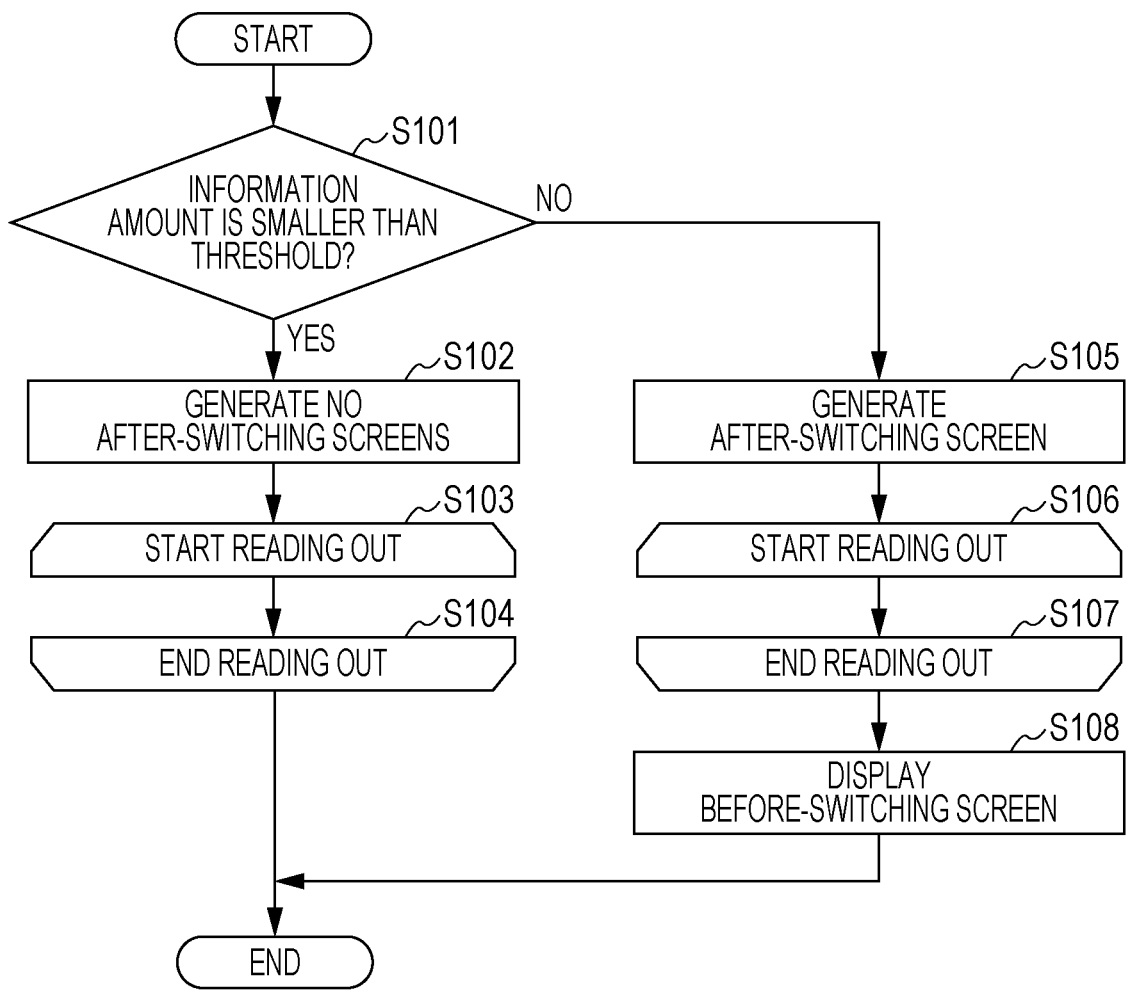
FIG. 8 is a flowchart of the process of determining how to control display on the basis of the amount of information in a before-switching screen.

FIG. 8 is a flowchart of the process of determining how to control the display on the basis of the amount of information in the before-switching screen 300.

In step S101, the CPU 201 determines whether the amount of information in the before-switching screen 300 is smaller than the predetermined threshold.

If the CPU 201 determines that the amount of information in the before-switching screen 300 is smaller than the predetermined threshold in step S101, the CPU 201 does not generate the after-switching screen 400 (step S102).

According to the first exemplary embodiment, the reading-out function starts reading out (step S103), and ends the reading out (step 104).

In contrast, if the CPU 201 determines that the amount of information in the before-switching screen 300 is not smaller than the predetermined threshold in step S101, the CPU 201 generates the after-switching screen 400 (step S105). Specifically, the after-switching screen 400 as illustrated in FIG. 3B, 5B, or 6B is generated.

Then, the reading-out function starts reading out (step S106), and ends the reading out (step 107).

After that, the CPU 201 recovers the display. Thus, the before-switching screen 300 is displayed again (step S108).

In addition, for example, the CPU 201 does not necessarily generate the after-switching screen 400 also when the display position of the specific information 450 in the before-switching screen 300 satisfies the predetermined condition.

Figure 9:
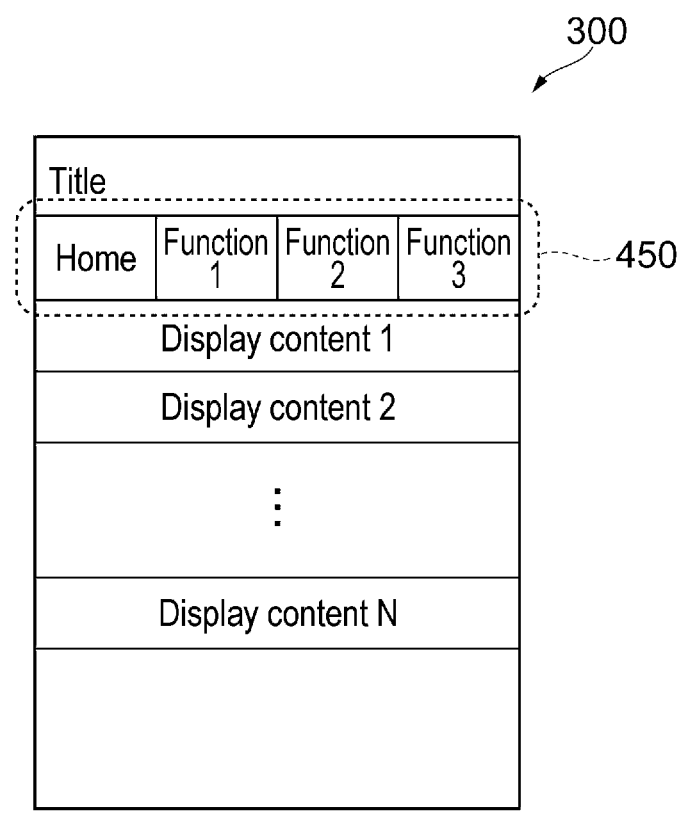
FIG. 9 is a diagram illustrating a before-switching screen example.

Specifically, for example, as illustrated in FIG. 9 which illustrates an example of the before-switching screen 300, when the specific information 450 is already located in an upper portion of the screen in the before-switching screen 300, the after-switching screen 400 is not necessarily generated.

In this case, even when the before-switching screen 300 is still displayed without generation of the after-switching screen 400, the specific information 450 is read out early.

Second Exemplary Embodiment

The case in which the specific information 450 is displayed at a single position in the before-switching screen 300 is described above. This is not limiting. The specific information 450 may be displayed at two or more positions in a screen corresponding to the before-switching screen 300. In other words, the same information (common information) may be displayed at two or more positions initially.

Figure 10:
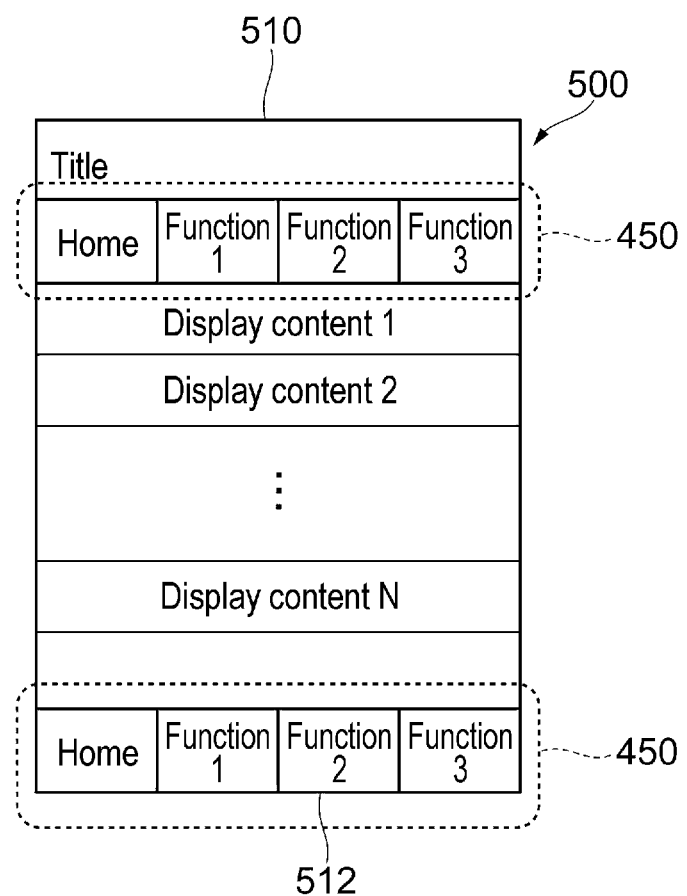
FIG. 10 is a diagram illustrating an exemplary screen displayed on a display unit.

Specifically, in this case, for example, as illustrated in FIG. 10 which illustrates an exemplary screen displayed on a display unit, the CPU 201 generates, as a screen displayed on the display apparatus 206 (see FIG. 2), a screen in which predetermined specific information 450 is displayed at least at two positions, a first display position for the first reading out and a second display position for the second reading out.

More specifically, in this example, a screen, in which the specific information 450 is displayed both on the top end 510 side and on the bottom end 512 side of the display unit 500, is generated as a screen in which the specific information 450 is displayed at least at two positions.

Thus, if the specific information 450 is displayed at two positions initially, without generation of the after-switching screen 400 as described above, the specific information 450 is read out early while the operability of the operator is maintained.

Each of "Home", "Function 1", "Function 2", and "Function 3", which constitute the specific information 450, is exemplary display information of which the operator's selection causes the display to be switched on the display unit 500.

According to the first exemplary embodiment, like the case described above, when the operator touches, for selection, the display position of the display information, the screen is switched. Thus, the screen associated with the selected display information is displayed.

Others

The cases in which the after-switching screen 400 and the screen illustrated in FIG. 10 are generated in the information processing apparatus 200 are described above. An apparatus different from the information processing apparatus 200 may generate these screens. The different apparatus may transmit a generated screen to the information processing apparatus 200.

More specifically, a server connected to the information processing apparatus 200 may generate the after-switching screen 400 and the screen illustrated in FIG. 10, which are transmitted from the server to the information processing apparatus 200.

In this case, the server serves as the information processing apparatus 200 which generates a screen.

Like the case described above, the "generation" performed by the server is not limited to generation of the after-switching screen 400 which is performed by editing the before-switching screen 300.

The "generation" encompasses a form in which the after-switching screen 400, which is generated in advance, is stored in a storage device and is read from the storage device for acquisition.

In addition, each piece of information displayed in a screen is associated in advance with the degree of importance. When each piece of information in the screen is read out, the reading condition for the piece of information may be made different in accordance with the degree of importance.

Specifically, for example, the volume of voice, the pitch of voice, or the reading speed in reading out may be made different in accordance with the degree of importance.

More specifically, for example, when the specific information 450 includes multiple pieces of information, such as "Home", "Function 1", "Function 2", and "Function 3" as described above, the first piece of specific information 450 may be associated with information for making the volume large in reading out of the first piece of specific information 450.

In this case, the first piece of specific information 450 is read out so that the first piece is emphasized. In this case, the operator of the information processing apparatus 200 easily recognizes start of reading out of the specific information 450.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus generating a screen displayed on a display apparatus having a reading-out function of reading out display content sequentially, the information processing apparatus comprising:
   a processor configured to:
      cause display content to be read out from a before-switching screen, the before-switching screen being a screen displayed before switching display on the display apparatus,
      wherein specific information included in the before-switching screen is read out after sequentially reading out the display content to be read out from the before-switching screen; and
      generate an after-switching screen, the after-switching screen being a screen displayed after the switching, and the after-switching screen including the specific information included in the before-switching screen,
      wherein the specific information included in the after-switching screen is read out before sequentially reading out the display content to be read out from the after-switching screen.

2. The information processing apparatus according to claim 1,
   wherein, when the display apparatus enters a specific state, the processor is configured to generate the after-switching screen.

3. The information processing apparatus according to claim 2,
   wherein, even when the display apparatus enters the specific state, if the before-switching screen satisfies a predetermined condition, the processor is configured not to generate the after-switching screen.

4. The information processing apparatus according to claim 3,
   wherein, when an amount of information in the before-switching screen is smaller than a predetermined threshold, the processor is configured not to generate the after-switching screen.

5. The information processing apparatus according to claim 3,
   wherein, when a display position of the specific information in the before-switching screen satisfies the predetermined condition, the processor is configured not to generate the after-switching screen.

6. The information processing apparatus according to claim 2,
   wherein, when the reading-out function of the display apparatus is enabled, the processor is configured to generate the after-switching screen.

7. The information processing apparatus according to claim 1,
   wherein the processor is configured to generate, as the after-switching screen, a screen having a smaller amount of information than an amount of information in the before-switching screen.

8. The information processing apparatus according to claim 1,
   wherein the reading-out function of the display apparatus reads out the display content displayed on a display unit included in the display apparatus, the reading out being performed sequentially from display content close to a predetermined reference to display content far from the reference, and
   wherein the processor is configured to generate, as the after-switching screen, a screen in which the specific information is displayed closer to the reference than a display position of the specific information in the before-switching screen.

9. The information processing apparatus according to claim 1,
   wherein the processor is configured to generate, as the after-switching screen, a screen in which a position of the specific information in reading order is higher than a position of the specific information in reading order used in a case where the display content of the before-switching screen is read out sequentially.

10. The information processing apparatus according to claim 1,
    wherein the processor is configured to generate, as the after-switching screen, a screen in which the specific information is displayed at a plurality of positions, the screen being a screen in which the specific information is read out at an earlier time than a time at which the specific information is read out when the display content is read out sequentially in the displayed before-switching screen.

11. The information processing apparatus according to claim 10,
    wherein the reading-out function of the display apparatus reads out the display content displayed on a display unit included in the display apparatus, the reading out being performed sequentially from display content close to a first end of the display unit to display content close to a second end of the display unit, and
    wherein the processor is configured to generate, as the screen in which the specific information is displayed at the plurality of positions, a screen in which the specific information is displayed both on a side of the first end and on a side of the second end of the display unit.

12. The information processing apparatus according to claim 1,
    wherein the reading-out function of the display apparatus reads out the display content displayed on a display unit included in the display apparatus, the reading out being performed sequentially from display content close to a predetermined reference to display content far from the reference, and
    wherein the processor is configured to generate, as the after-switching screen, a screen in which the specific information is displayed additionally closer to the reference than a display position of the specific information in the before-switching screen.

13. An information processing apparatus generating a screen displayed on a display apparatus having a reading-out function of reading out display content sequentially, the information processing apparatus comprising:
a processor configured to:
generate a screen in which display information is displayed at least at two positions,
wherein the display information displayed at each of the at least two positions comprises the same information; and
switch display on the display apparatus when the display information at one of the at least two positions is displayed and selected by an operator, the at least two positions including a first display position and a second display position,
wherein the first display position is a position at which the display information is read out at a first time, and the second display position is a position at which the display information is read out at a second time, the first time being earlier than the second time.

14. The information processing apparatus according to claim 13,
wherein the reading-out function of the display apparatus reads out the display content displayed on a display unit included in the display apparatus, the reading out being performed sequentially from display content close to a first end of the display unit to display content close to a second end, and
wherein the processor is configured to generate, as the screen in which the display information is displayed at least at two positions, a screen in which the display information is displayed both on a side of the first end and on a side of the second end of the display unit.

15. A non-transitory computer readable medium storing a program causing a computer to execute a process on a screen displayed on a display apparatus having a function of reading out display content sequentially, the process comprising:
causing display content to be read out from a before-switching screen, the before-switching screen being a screen displayed before switching display on the display apparatus,
wherein specific information included in the before-switching screen is read out after sequentially reading out the display content to be read out from the before-switching screen; and
generating an after-switching screen, the after-switching screen being a screen displayed after the switching, and the after-switching screen including the specific information included in the before-switching screen,
wherein the specific information included in the after-switching screen is read out before sequentially reading out the display content to be read out from the after-switching screen.

16. A non-transitory computer readable medium storing a program causing a computer to execute a process on a screen displayed on a display apparatus having a function of reading out display content sequentially, the process comprising:
generating a screen in which display information is displayed at least at two positions,
wherein the display information displayed at each of the at least two positions comprises the same information; and
switching display on the display apparatus when the display information at one of the at least two positions is displayed and selected by an operator, the at least two positions including a first display position and a second display position,
wherein the first display position is a position at which the display information is read out at a first time, and the second display position is a position at which the display information is read out at a second time, the first time being earlier than the second time.

* * * * *